United States Patent [19]

Mori

[11] 4,361,275
[45] Nov. 30, 1982

[54] SOLENOID VALVE WITH TEMPERATURE SAFETY UNIT

[75] Inventor: Kojiro Mori, Okazaki, Japan

[73] Assignee: Aisin Seiki Kabushiki Kaisha, Aichi, Japan

[21] Appl. No.: 297,192

[22] Filed: Aug. 28, 1981

[30] Foreign Application Priority Data

Aug. 29, 1980 [JP] Japan ................................ 55-120100

[51] Int. Cl.³ ........................................... G05D 23/26
[52] U.S. Cl. ..................................... 236/88; 219/495; 335/146
[58] Field of Search .......................... 236/88; 219/495; 335/208, 146

[56] References Cited

U.S. PATENT DOCUMENTS

| | | | |
|---|---|---|---|
| 2,390,985 | 12/1945 | Boyer | 236/88 X |
| 2,678,774 | 5/1954 | Arvin | 236/88 X |
| 2,688,446 | 9/1954 | Wittmann | 236/88 |
| 3,197,003 | 7/1965 | Yetter | 236/88 X |
| 3,328,561 | 6/1967 | Sakamoto et al. | 219/495 X |
| 4,005,726 | 2/1977 | Fowler | 335/146 X |
| 4,303,196 | 12/1981 | Raines et al. | 236/88 |

FOREIGN PATENT DOCUMENTS

| | | | |
|---|---|---|---|
| 1232260 | 1/1967 | Fed. Rep. of Germany | 335/146 |
| 892862 | 3/1943 | France | 335/146 |

Primary Examiner—William E. Tapolcai
Attorney, Agent, or Firm—Oblon, Fisher, Spivak, McClelland & Maier

[57] ABSTRACT

A solenoid valve with a temperature safety unit includes a body having a fluid passage formed therein, a solenoid mounted in the body, a valve member operatively associated with the body for displacement to open or close the fluid passage in response to a magnetic field as the solenoid is energized and deenergized, and a return spring operatively associated with the body and which includes a magnetically soft, amorphous metal member disposed in a pass of flux from the solenoid within a region the temperature of which is to be determined wherein the return spring is connected to the valve member and normally urges the valve member to a first position when the solenoid is deenergized, the magnetically soft, amorphous metal member having a Curie point which constitutes an operating point of the return spring such that when the temperature of the return spring exceeds the Curie point, the valve member is forceably displaced to the first position irrespective of energization of the solenoid.

5 Claims, 2 Drawing Figures

SOLENOID VALVE WITH TEMPERATURE SAFETY UNIT

BACKGROUND OF THE INVENTION

Field of the Invention

The present invention is directed to a solenoid valve, and more particularly to a solenoid valve having a temperature safety unit.

SUMMARY OF THE INVENTION

The invention has for its object the provision of solenoid valve for opening or closing a fluid passage in response to a magnetic action which is produced as a solenoid is energized or deenergized and in which the valve is provided with a temperature safety unit which is operative, whenever the temperature of a region within the valve the temperature of which is to be determined exceeds a predetermined value to displace a valve member forcibly to one position which is normally assumed when the solenoid remains deenergized, irrespective of the energization of the solenoid.

In accordance with the present invention, a solenoid valve with a temperature safety unit is provided which includes a body having a fluid passage formed therein, a solenoid mounted in the body, a valve member operatively associated with a body for displacement to open or close the fluid passage in response to a magnetic field as the solenoid is energized and deenergized, and a return spring operatively associated with the body and which includes a magnetically soft, amorphous metal member disposed in a path of flux from the solenoid within a region the temperature of which is to be determined wherein the return spring is connected to the valve member and normally urges the valve member to a first position when the solenoid is deenergized, the magnetically soft, amorphous metal member having a Curie point corresponding to the operating point of the return spring such that when the temperature of the return spring exceeds the Curie point, the valve member is forceably displaced to the first position irrespective of energization of the solenoid.

BRIEF DESCRIPTION OF THE DRAWINGS

Various other objects, features and attendant advantages of the present invention will be more fully appreciated as the same becomes better understood from the following detailed description when considered in connection with the accompanying drawings in which like references characters designate like or corresponding parts through the several views and wherein.

DETAILED DESCRIPTION OF THE PREFERRED EMBODIMENT

Figure 1:
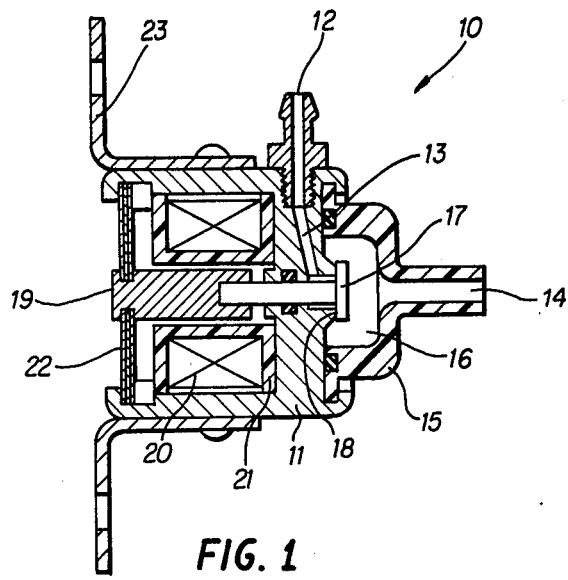
FIG. 1 is a cross sectional view of one embodiment of the present invention.

One embodiment of the invention will now be described with reference to the drawings. A solenoid valve with temperature safety unit is generally designated by reference number 10 and includes a body 11 of a magnetic material. The body is formed with a passage 13 which is maintained in communication with an inlet port 12. An outlet port 14 is defined in a cover 15 of a synthetic resin material. Both body 11 and cover 15 are hermetically sealed together to define a valve chamber 16 therein which is maintained in communication with port 14.

A valve member 17 of non-magnetic material is disposed in valve chamber 16 to allow for or interrupt communication between valve chamber 16 and passage 13. In this manner, valve member 17 is capable of controlling communication through a fluid passage including input port 12, passage 13, valve chamber 16 and output port 14. Valve member 17 cooperates with a valve seat 18 formed on body 11 and is supported by body 11 so as to be axially slidable therein.

Valve member 17 is at one end thereof connected to a plunger 19 of a magnetic material. A solenoid 20 is disposed on a bobbin 21 which is in turn disposed in surrounding relationship with plunger 19 and can be energized or deenergized to control displacement of plunger 19. The opposite end of plunger 19 is exposed to a region, the temperature of which is to be determined. Plunger 19 is also disposed in a path of flux from solenoid 20 and a return spring 22 which has its outer periphery secured to the body 11 is clamped around the opposite end of plunger 19. Return spring 22 is formed of a plurality of sheets of a magnetically soft, amorphous metal having an excellent resilience and exhibiting a high permeabiility below the Curie point but which changes to a paramagnetic material at or above the Curie point. Solenoid 20 is mounted at a desired location by means of a bracket 23.

Figure 2:
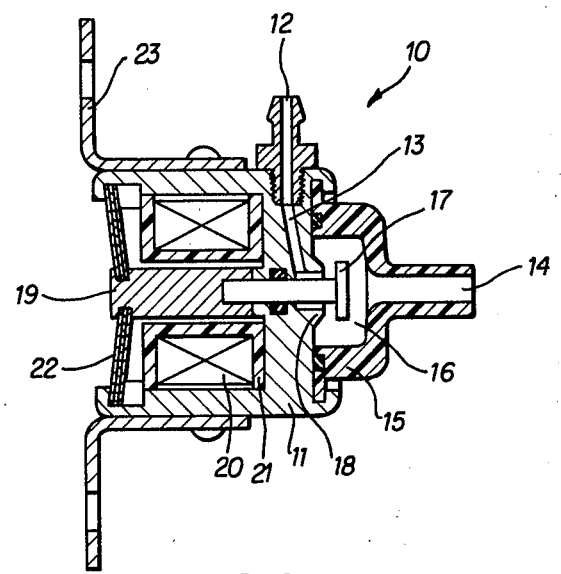
FIG. 2 is a cross sectional view similar to FIG. 1 illustrating operation of the present invention.

In operation, when solenoid 20 is deenergized, the resilience of return spring 22 urges plunger 19 to the left, as shown in FIG. 1, whereby valve member 17 engages valve seat 18 to interrupt communication between valve chamber 16 and passage 13. However, when solenoid 20 is energized, and the flux therefrom passes through a path including body 11, return spring 22 and plunger 19 to thereby excite plunger 19, plunger 19 is displaced to the right as shown in FIG. 2 against the resilience of return spring 22. Valve member 17 then moves away from valve seat 18 to allow communication between valve chamber 16 and passage 13.

When the temperature of the region the temperature of which is to be determined exceeds the Curie point of the magnetically soft, amorphous metal which forms spring 22, the metal changes to a paramagnetic body so that the flux path to excite the plunger 19 is interrupted at the location of return spring 22 if the solenoid 20 remains energized. Thereupon, the resilience of return spring 22 causes plunger 19 to be displaced to the left as shown in FIG. 1, forcibly causing valve member 17 to be seated against valve seat 18, thus interrupting communication between valve chamber 16 and passage 13.

A preferred magnetically soft, amorphous metal which forms return spring 22 is a cobalt system. By changing the content of cobalt, the Curie point can be freely chosen in a range from approximately −30° C. to +300° C. Accordingly, the temperature at which valve member 17 should be forcibly displaced to its non-excited position irrespective of the enerization of solenoid 20 can also be freely established.

As an example of the application of the apparatus according to the invention, such may be disposed in a fuel feed path of an oil fired heater, for example. In use, solenoid 20 is energized to supply the oil to the heater. In the event the heater becomes overheated, the temperature will exceed the Curie point of the amorphous metal which forms return spring 22 whereby the oil supply can be forcibly interrupted, thus preventing a fire or similar event from occurring.

It should be understood that the invention is not limited to the particular embodiment disclosed but that an arrangement may be utilized such that communication through the fluid path is possible when the solenoid is deenergized while the passage is interrupted when the solenoid becomes energized.

As discussed above, in the arrangement of the invention, a solenoid valve for allowing or interrupting a communication through a fluid passage in response to the energization or deenergization of a solenoid utilizes a magnetically soft, amorphous metal to form a return spring associated with a valve member, with the return spring being disposed in a region the temperature of which is to be determined and in a path of flux from the solenoid and extending through the valve member. As a result, when the temperature of the region exceeds the Curie point of the amorphous metal, which represents the operating point of the solenoid valve, the valve member is forcibly displaced by the return spring to its non-excited position, irrespective of energization of the solenoid. The use of the return sping to define part of the flux path from the solenoid and to establish the temperature at which the valve member should be forcibly operated permits the solenoid valve to be simply constructed with a reduced number of parts.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A solenoid valve with a temperature safety unit comprising:
   a body having a fluid passage;
   a solenoid mounted in said body;
   a valve member operatively associated with said body for displacement to open or close said fluid passage in response to a magnetic field as said solenoid is energized and deenergized; and
   return spring means operatively associated with said body and which comprises a magnetically soft, amorphous metal member disposed in a path of flux from said solenoid within a region the temperature of which is to be determined wherein said return spring is connected to said valve member and normally urges said valve member to a first position when said solenoid is deenergized, said magnetically soft, amorphous metal member having a Curie point comprising an operating point of said return spring means such that when the temperature of said return spring means exceeds the Curie point, said valve member is forcibly displaced to said first position irrespective of energization of said solenoid.

2. A solenoid valve as set forth in claim 1, further comprising a magnetic plunger interconnecting said valve member and said return spring means.

3. A solenoid valve as set forth in claim 1, wherein said return spring means comprises a plurality of sheets of magnetically soft amorphous metal members.

4. A solenoid valve as set forth in claim 1, wherein said body further comprises a valve seat operatively engageable with said valve member.

5. A solenoid valve as set forth in claim 1, further comprising a magnetic plunger interconnecting said valve member and said return spring means wherein said return spring means comprises a plurality of sheets of magnetically soft, amorphous metal members and wherein said body further comprises a valve seat operatively engageable with said valve member.

* * * * *